Jan. 12, 1954

E. P. COURTILLOT 2,666,181

PHASE MODULATION SYSTEM

Filed Aug. 31, 1949

2 Sheets-Sheet 1

Inventor:
Emmanuel P. Courtillot,
by Merton D. Morse
His Attorney.

Inventor:
Emmanuel P. Courtillot,
by Merton D. Moore
His Attorney.

Patented Jan. 12, 1954 2,666,181

UNITED STATES PATENT OFFICE 2,666,181

PHASE MODULATION SYSTEM

Emmanuel P. Courtillot, Paris, France, assignor to General Electric Company, a corporation of New York Application August 31, 1949, Serial No. 113,465

Claims priority, application France September 23, 1948

7 Claims. (Cl. 332—23)

This invention relates to angular modulation systems generally, and more particularly to a new and improved phase modulation system which is capable of providing linear phase deviations having any desired amplitude.

A basic limitation in many systems of phase and frequency modulation is the requirement that the amplitude of the carrier wave be large relative to that of the modulating signal. Thus, in the well-known phase modulation system wherein a carrier wave is initially amplitude modulated and the side bands are thereafter shifted in phase by 90° to provide an equivalent phase modulation, the maximum phase deviation must be limited to approximately ±25°, if undesirable harmonics of the modulating signal are to be kept within reasonable limits. Other systems of modulation suffer from similar limitations if linearity of the phase deviation is to be obtained. My invention permits the production of very large deviations in phase while maintaining the conditions necessary for a linear relation between the extent of the phase deviation and the amplitude of the modulating signal.

In accordance with my invention, the modulating signal is explored or sampled by amplitude levels. The range or scale of amplitude in the modulating signal is divided into discrete levels, and each level is correlated to a carrier voltage of a particular phase. The phase angle of the carrier wave correlated to any particular amplitude level in the modulating signal may be selected to produce linear modulation. Then, by providing a sufficient number of reference levels throughout the scale or range of permissible amplitudes of the modulating signal, distortionless modulation with linear phase deviation may be obtained.

Accordingly, it is an object of my invention to provide a new and improved system of phase modulation.

Another object of my invention is to provide a linear phase modulation system in which there is substantially no limitation on the magnitude of the phase deviation that may be obtained.

A further object of my invention is to provide a basic selector circuit for correlating a particular reference level in the amplitude of a modulating signal with a carrier wave of a particular phase.

For further objects and advantages and for a better understanding of the invention, attention is now directed to the following description and accompanying drawings. The features of my invention believed to be novel will be more particularly pointed out in the appended claims.

Figure 1:
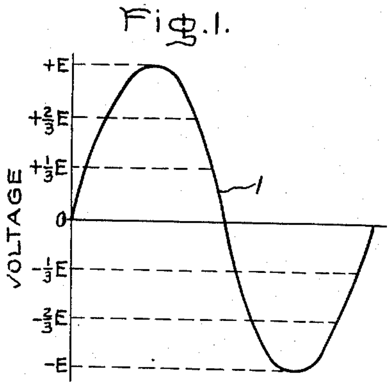
Figure 2:
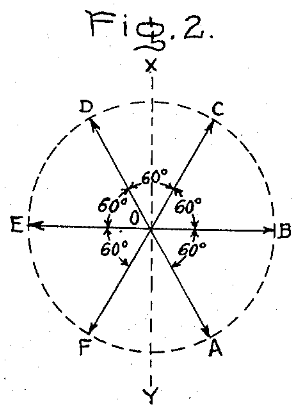
Figure 3:
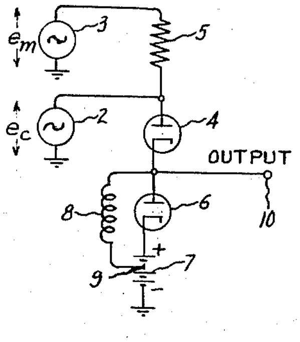
Figure 4:
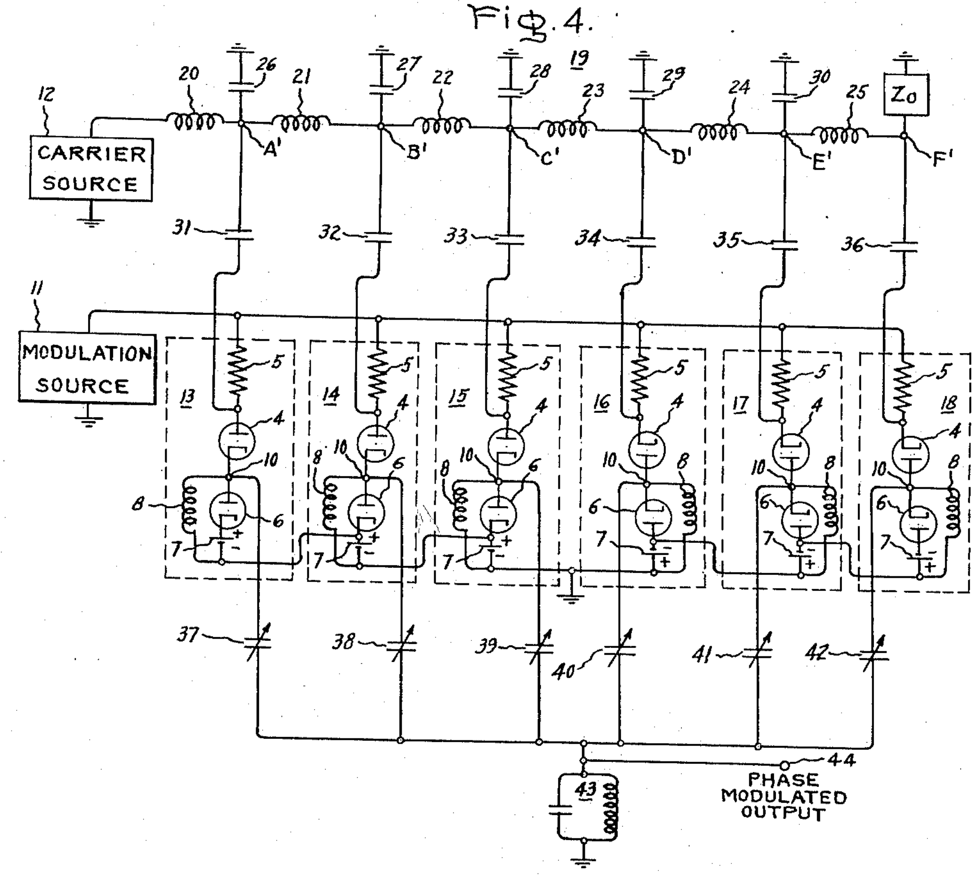
Figure 5:
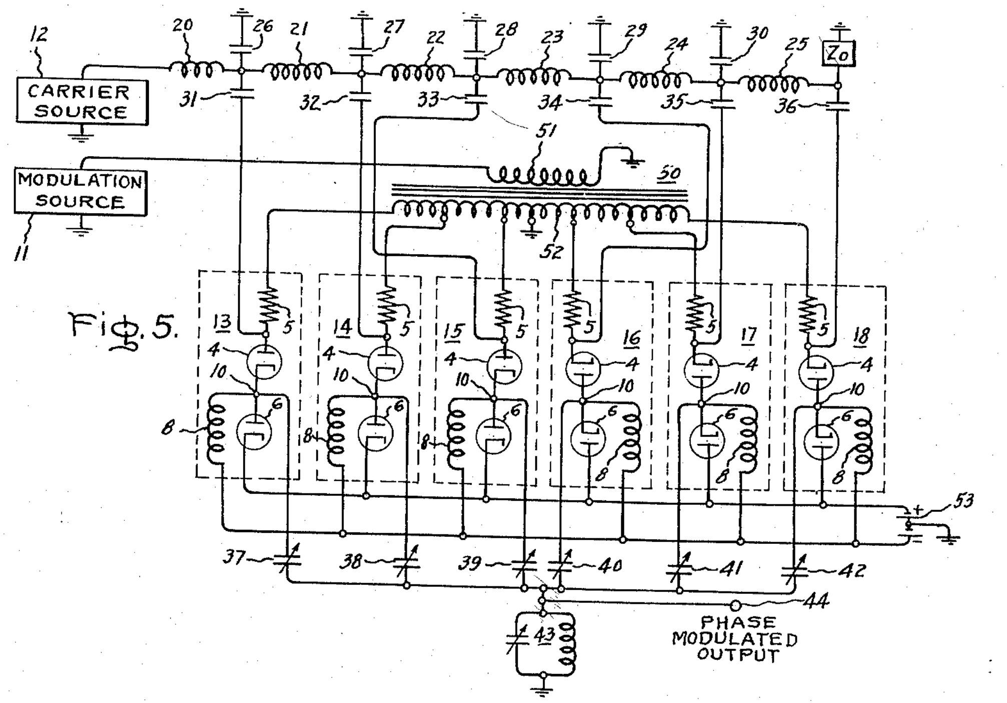
Figure 6:
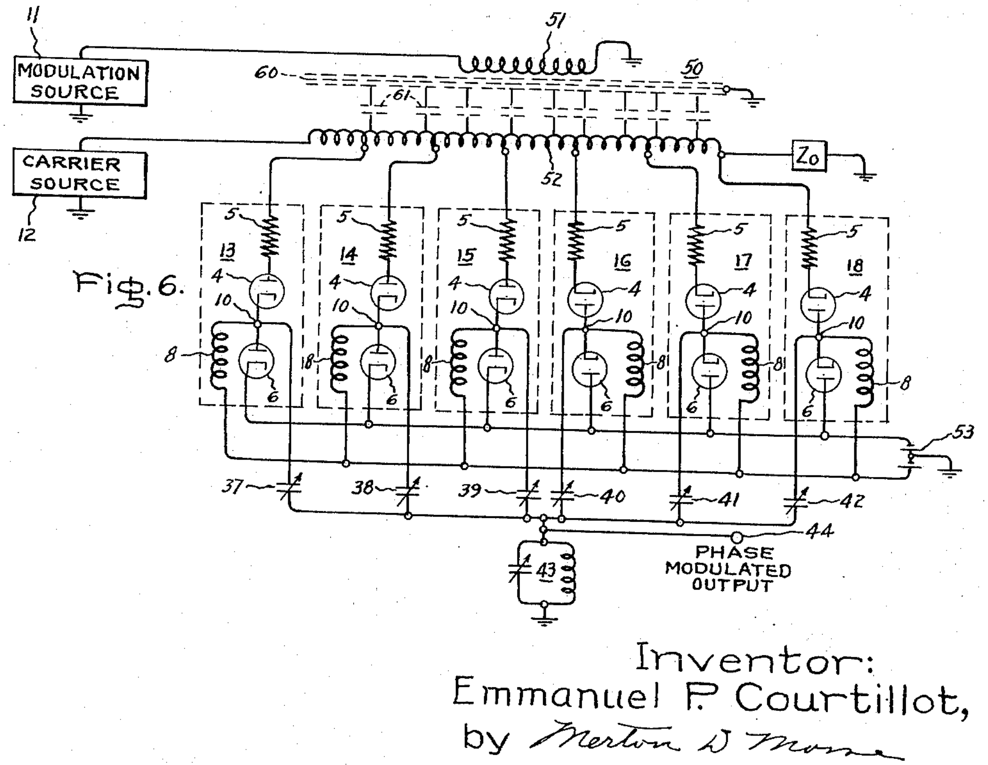

In the drawings, Figs. 1 and 2 are graphs illustrating the correlation between the voltage levels in a modulating signal and the corresponding phases in a carrier wave, in accordance with the principles of my invention; Fig. 3 is a schematic diagram of the basic reference level selector circuit of my invention; Fig. 4 is a schematic diagram of a preferred form of a phase modulating system embodying my invention; and Figs. 5 and 6 are schematic diagrams of phase modulating systems embodying my invention and containing certain modifications with relation to the circuit of Fig. 4.

Referring to Fig. 1, curve 1 represents a modulating signal of maximum amplitude E. It is possible to divide the total amplitude excursion of this wave between the limits +E and −E into equal voltage levels, as shown by the dotted lines at amplitudes ±⅓E, ±⅔E and ±E. Referring now to Fig. 2, the dotted line 0X represents a reference phase in a carrier wave, arbitrarily selected to correspond to zero amplitude in the modulating signal, or, in other words, to the complete absence of a modulating signal. Vectors 0A through 0F represent carrier voltages at phase angles differing through 60°, vectors 0C and 0D being respectively advanced and retarded 30° with respect to the reference vector 0X.

In accordance with my invention, modulation is effected by making each one of the reference levels, into which the modulating signal has been divided, correspond to a different phase vector in the carrier wave, as shown in Fig. 2. For instance, when the amplitude of the modulating signal is +⅓E, the phase of the carrier voltage is 0C. Similarly, amplitude +⅔E results in a carrier of reference phase 0B, and amplitude +E results in a carrier voltage of reference phase 0A. On the negative half-cycle of the modulating signal, amplitudes −⅓, −⅔E, and −E result in carrier voltages of reference phases 0D, 0E and 0F respectively. My invention provides a basic selector circuit which automatically produces a carrier voltage of the phase required for any reference level in the modulating signal. It will be obvious that it is possible to provide a greater number of reference levels, so that the phase variation in the carrier wave occurs in a substantially continuous fashion, rather than by discrete steps. Also, it is possible to provide greater relative phase differences between the reference vectors, so that any phase deviation desired may be obtained while yet maintaining linearity between the amplitude of the modulating signal and the extent of the phase deviation.

Referring now to Fig. 3, there is shown a schematic diagram of a preferred form of my basic selector circuit which comprises two rectifying elements connected to form a polarized unilaterally conducting couple. As stated previously, the function of the selector circuit is to provide the required correspondence between the instantaneous level of the modulating signal and the instantaneous phase of the carrier wave. A carrier wave having the desired relative phase is provided by a source 2 whose output voltage is denoted by $e_c$. The modulating signal is provided by a source 3 whose output voltage is denoted by $e_m$. Source 2 is directly connected to the anode of a diode rectifier 4, whereas source 3 is connected to this same anode through a series resistor 5. A second diode rectifier 6 is connected in series with the first diode 4 and its cathode is connected to a source of positive bias provided by a battery 7. The junction point of diodes 4 and 6 is connected through an inductance 8 to a point 9 of lesser positive bias in battery 7. The junction point of diodes 4 and 6 is connected to an output terminal 10.

For purposes of illustration, it will be assumed that the function of the selector circuit of Fig. 3 is to provide a carrier voltage of reference phase 0B at output terminal 9, whenever the amplitude of the modulating signal corresponds to the reference level $+\frac{2}{3}E$. Battery 7 is then so proportioned that a positive bias voltage of magnitude $\frac{2}{3}E+e_c$ is provided to the junction points of diodes 4 and 6, whereas a positive bias voltage of magnitude $E+e_c$ is provided to the cathode of diode 6. Under these circumstances, diode 4 is non-conductive until the modulating signal attains the amplitude $\frac{2}{3}E$. This results from the fact that when the sum of instantaneous amplitudes of the modulating signal and the carrier voltage is less than $\frac{2}{3}E+e_c$, the anode of diode 4 is less positive than its cathode and so, cannot conduct. As soon as this value is exceeded, diode 4 becomes conducting, so that the carrier voltage provided by source 2 is transmitted to output terminal 10. Inductance 8 constitutes a high impedance at the relatively high frequency of the carrier voltage and does not affect the output. Accordingly, a carrier voltage of a selected phase, as provided by source 2, is produced at output terminal 10.

When the amplitude of the modulating signal reaches the level $+E$, diode 6 becomes conducting and presents a low impedance to the carrier voltage provided by source 2. Output terminal 10 is then shunted or effectively short-circuited to ground through battery 7 so that no output voltage occurs. Thus, the selector circuit shown in Fig. 3 is capable of providing an output voltage of any one selected reference phase, as provided by source 2, whenever the instantaneous amplitude of a modulating signal provided by source 3 occurs between certain fixed voltage levels. It will be obvious that the location of these levels can be changed at will by varying the positive bias or polarization provided to the diodes by battery 7.

A phase modulating system in accordance with my invention contains as many selector circuits, analogous to that of Fig. 3 which has been described, as there are reference levels established in the amplitude of the modulating signal. Evidently, the polarization or bias provided to the diodes will vary from one circuit to the next. For instance, if there are to be six reference levels in the modulating signal, there will be six basic selector circuits corresponding to that of Fig. 3. In such a system, commutation from one selector circuit to the next, is effected in a satisfactory progressive fashion when the amplitude of the carrier wave is equal to or inferior to $E/N$, where E is the amplitude of the modulating signal, and N is the number of basic selector circuits, for instance, six circuits in the system now to be described. Thus, the amplitude of the carrier voltage will be $\frac{1}{6}$ of the maximum allowable amplitude of the modulating signal.

Referring now to Fig. 4, there is shown a phase modulating system which comprises six of the basic selector circuits shown in Fig. 3. The modulating signal is provided by a source 11, whereas the carrier voltage is provided by a source 12. Source 11 is directly connected to the resistors 5 in six selector circuits 13 through 18, each equivalent to the basic selector circuit of Fig. 3. Source 12 is connected to a phase delay line 19, constituted by a plurality of inductances, 20 through 25, connected in series, with shunt capacitances 26 through 30 connected in parallel to ground. Since the construction of such a delay line is well known in the art, it will not be described in detail. The line is terminated in its characteristic impedance $Z_0$ so as to provide substantially no wave reflection from the end. The inductances and capacitances in the line are so proportioned that a phase delay of 60 degrees occurs per section. Thus, assuming that the voltage at point A′ has a reference phase corresponding to vector 0A in Fig. 2, then the carrier voltage at points B′, C′, D′, E′ and F′ will have reference phases 0B, 0C, 0D, 0E and 0F respectively.

Point A′ in phase delay line 19 is connected by means of a capacitor 31, to selector circuit 13, at a point corresponding to the anode of diode 4. Similarly, the other points B′ through F′ in the phase delay line are connected through capacitors 32, 33, 34, 35, and 36 to corresponding points in selector circuits 14, 15, 16, 17, and 18.

Instead of providing each selector circuit with separate batteries to produce the necessary bias or polarization, a cumulative circuit is utilized so that only one small battery 7 need be provided for each selector circuit, the batteries for the adjacent selector circuits being used in cascade with respect to a common ground point. The output terminals 10 in each selector circuit 13 through 18, are connected by capacitors 37 through 42, to an output circuit 43, which is broadly resonant at the carrier frequency, and to an output terminal 44. Capacitors 37 through 42 are adjustable so as to permit equalization of the amplitudes of the signals provided by each of the selector circuits. Since the characteristics of the diodes and circuit elements in each selector circuit may not be identical, the provision of these variable capacitors is necessary in order to prevent distortion in the output voltage which would be caused by signals of unequal magnitude from each selector circuit. Also, these capacitors serve to provide a high impedance between the output terminal 10 of each selector circuit and the common output circuit 43 so as to decouple the selector circuits one from another. Thus, reaction between the different selector circuits, during the commutation process, is avoided.

The battery 7 in each selector circuit 13 through 18, is selected so that selector circuits 13 through 18 conduct at modulating signal levels $+E$, $+\frac{2}{3}E$, $+\frac{1}{3}E$, $-\frac{1}{3}E$, $-\frac{2}{3}E$ and $-E$ respectively. When the amplitude of the modulating signal is contained within the limits of $+\frac{1}{3}E$ and $-\frac{1}{3}E$, diode 4 of selector circuits 15 and 16 are the only ones conducting, so that the phase of the output voltage is the resultant of vectors 0E and 0C in Fig. 2, that is, it is a vector of reference phase 0X. Then, as the amplitude of the signal passes through the various reference levels, the corresponding selector circuit conducts and permits the phase of the output voltage to vary accordingly. It will be noted that selector circuits 16, 17, and 18 have their diode polarities reversed from those shown in the selector circuit of Fig. 3. This is to permit these diodes to operate on negative reference voltage levels in the modulating signal. In operation, the substitution of a carrier voltage of varying reference phase is gradually effected by reason of the progressive operation of each of the selector circuits, the whole operating as a commutation system to provide a phase modulated output. While the system that has been described provides a maximum phase shift of +150°, the relative phase difference between the reference levels may be chosen considerably greater. Moreover, the number of reference leads may be made as large as desired, and thus it is feasible to obtain phase deviation in excess of 360°.

Referring to Fig. 5, the circuit therein illustrates a modification of the modulating system of Fig. 4, in which the same reference numerals have been used to denote corresponding elements. Instead of the direct connection of the modulation source 11 to the selector circuits, a transformer 50 is provided. Source 11 is connected to the primary 51 of the transformer, and the resistors 5 in the selector circuits 13 through 18 are connected to tap points in the secondary 52. A single battery 53 provides the same bias voltages to all the selector circuits. The remainder of the circuit is essentially the same as that of Fig. 4.

The circuit of Fig. 5 has the advantage that only one source of bias voltage is required. This feature results from the fact that each selector circuit is provided with a modulating signal whose amplitude increases proportionally to the rank or level of the selector circuit in the commutation system. The increase in the amplitude of the modulating signal is provided by connecting the selector circuits to progressively advanced points on secondary 52. Since the operation of the circuit is very similar to that of Fig. 4, it will not be described in detail. Briefly, when the amplitude of the modulating signal passes from one reference level to the next, succeeding diodes become progressively operative, whereas preceding ones become short-circuited. This results in commutation of the carrier voltage with respect to the different reference phase points, thereby providing a phase modulated output carrier voltage at terminal 44.

Referring to Fig. 6, there is shown another modification in which transformer 50 provides the additional function of serving as a delay line. It will be apparent to those skilled in the art that it is possible to wind the secondary of a transformer in separate sections or pi's which are disposed at slight distances apart on a magnetic powdered-iron core 60. Each pi has an identical self-inductance and a capacitance with respect to the common magnetic core, as indicated by the dotted capacitance symbols 61. The secondary can then operate as a delay line in addition to serving as a transformer winding. Modulation source 11 is connected to primary winding 51, and carrier source 12 is connected to one end of secondary winding 52. The other end of secondary winding 52 is connected to ground through its characteristic impedance $Z_0$. The circuit then operates similarly to that of Fig. 5, with the additional feature that no separate delay line is required. The advantages in economy of such a construction are apparent.

While certain specific embodiments have been shown and described, it will, of course, be understood that various modifications may be made without departing from the invention. To mention but a few obvious modifications, crystal rectifiers may be substituted for the diodes and phasing circuits may be substituted for the delay lines. The appended claims are, therefore, intended to cover any such modifications within the true spirit and scope of the invention.

What I claim as new and desire to secure by Letters Patent of the United States is:

1. A selector circuit for transmitting a first applied signal when the instantaneous amplitude of a second applied signal occurs between two discrete levels, comprising a pair of unilaterally conducting devices each having a pair of unlike poles, a common connection between one pair of unlike poles in said devices, said signals being applied across the other pair of unlike poles, said first signal being applied directly and said second signal being applied through a series impedance, a first source of bias voltage connected through an impedance to said common connection for polarizing one of said devices so that it conducts and transmits said first signal when the amplitude of said second signal exceeds one of said discrete levels, and a second source of bias voltage for polarizing said other device so that it conducts and short-circuits said first signal when the amplitude of said second signal exceeds the other of said discrete levels, said first signal being recovered at said common connection.

2. The combination, in a phase modulation system, of a plurality of amplitude selectors, an output circuit, means to produce a plurality of carrier waves of the same frequency, each wave being displaced in phase with respect to the others of said carrier waves, means to supply each of said waves through a respective one of said amplitude selectors to said output circuit, means to supply modulating potential to each of said amplitude selectors, each of said amplitude selectors comprising means adapted to pass said carrier waves to said output circuit only when the modulating potential supplied thereto occurs between respective pairs of predetermined amplitude levels, each pair defining respective amplitude portions of said modulating potential, whereby as the amplitude of said modulating potential is varied through each of said discrete amplitude portions, respective ones of said carrier waves are supplied to said output circuit.

3. The combination, in a phase modulation system, of a plurality of amplitude selectors, an output circuit, means to produce a carrier wave, a phase delay line to which said carrier wave is applied for developing a plurality of carrier waves, each being displaced in phase with respect to the others of said waves, means to supply each of said waves through a respective one of said amplitude selectors to said output circuit, means to supply modulating potential to each of said amplitude selectors, each of said amplitude selectors comprising means adapted to pass said carrier waves to said output circuit only when the modulating potential supplied thereto occurs between respective pairs of predetermined amplitude levels, each pair defining respective amplitude portions of said modulating potential, whereby as the amplitude of said modulating potential is varied through each of said discrete amplitude portions respective ones of said carrier waves are supplied to said output circuit.

4. The combination, in a selector circuit for passing a wave small in amplitude in comparison to another wave when the instantaneous amplitude of the latter wave occurs between two predetermined levels, of a unilaterally conducting device, an output circuit being connected in series relationship with said device, means for applying each of said waves in series with said device and said output circuit, another unilaterally conducting device being connected in shunt with said output circuit, said one device being biased to become conductive at one predetermined level of said other wave to pass said one wave to said output circuit, and said other device being biased to become conductive at another predetermined amplitude level to prevent passage of said one wave to said output circuit, whereby said one wave is passed to said output circuit only when the amplitude of said other wave occurs between said one and said other levels.

5. The combination, in a phase modulation system, of a plurality of sources of carrier waves of the same frequency, the wave from each of said sources being displaced in phase with respect to the waves from the other of said sources, an output circuit, a group of unilaterally conducting devices, each of said devices being connected in series relationship with said output circuit and respective ones of said sources, means for supplying a modulating potential in series with each of said devices and said output circuit, a second group of unilaterally conducting devices, each being connected in shunt with said output circuit, the devices of said groups being paired, the device of each of said pairs in shunt with said output circuit being biased to become conductive at a predetermined amplitude level of said modulating potential, the other device of each of said pairs being biased to become conductive at another predetermined amplitude level of said modulating potential in a manner that carrier waves are passed to said output circuit when said other device in each pair is conducting until said one device becomes conducting, said pairs of levels being different for each of said pairs of devices and defining respective discrete amplitude portions of said modulating potential, whereby as the amplitude of said modulating potential is varied through each of said discrete amplitude portions respective ones of said carrier waves from said sources are supplied to said output circuit.

6. The combination, in a phase modulation system, of a plurality of sources of carrier waves of the same frequency and same amplitude, the wave from each of said sources being displaced in phase with respect to the waves from the other of said sources, an output circuit, a group of unilaterally conducting devices, each of said devices being connected in series relationship with said output circuit and respective ones of said sources, means for supplying a modulating potential in series with each of said devices and said output circuit, a second group of unilaterally conducting devices, each being connected in shunt with said output circuit, the devices of said groups being paired, the device of each of said pairs in shunt with said output circuit being biased to become conductive at a predetermined amplitude level of said modulating potential, the other device of each of said pairs being biased to become conductive at another predetermined amplitude level of said modulating potential in a manner that carrier waves are passed to said output circuit when said other device in each pair is conducting and until said one device becomes conducting, said pairs of levels being different for each of said pairs of devices and defining respective discrete amplitude portions of said modulating potential, said discrete amplitude portions being equal to the amplitude of the carrier waves from said sources, whereby as the amplitude of said modulating potential is varied through each of said discrete amplitude portions respective ones of said carrier waves from said sources are supplied to said output circuit.

7. The combination, in a phase modulation system, of a plurality of sources of carrier waves of the same frequency, the wave from each of said sources being displaced in phase with respect to the waves from the other of said sources, an output circuit, a group of unilaterally conducting devices, each of said devices being connected in series relationship with said output circuit and respective ones of said sources, means for supplying a modulating potential in series with each of said devices and said output circuit, a series of isolating impedances, a second group of unilaterally conducting devices, each of said devices of said second group being connected in shunt with said output circuit through respective ones of said isolating impedances whereby during conduction of each of said devices respective ones of said impedances appear in shunt with said output circuit, the devices of said groups being paired, the device of each of said pairs in shunt with said output circuit being biased to become conductive at a predetermined amplitude level of said modulating potential, the other device of each of said pairs being biased to become conductive at another predetermined amplitude level of said modulating potential in a manner that carrier waves are passed to said output circuit when said other device in each pair is conducting and until said one device becomes conducting, said pairs of levels being different for each of said pairs of devices and defining respective, discrete amplitude portions of said modulating potential, whereby as the amplitude of said modulating potential is varied through each of said discrete amplitude portions respective ones of said carrier waves from said sources are supplied to said output circuit.

EMMANUEL P. COURTILLOT.

References Cited in the file of this patent

UNITED STATES PATENTS

| Number | Name | Date |
|---|---|---|
| 2,048,081 | Riggs | July 21, 1936 |
| 2,077,223 | Crosby | Apr. 13, 1937 |
| 2,262,468 | Percival | Nov. 11, 1941 |
| 2,413,440 | Farrington | Dec. 31, 1946 |
| 2,420,374 | Houghton | May 13, 1947 |
| 2,469,837 | Mohr | May 10, 1949 |
| 2,483,271 | Frink | Sept. 27, 1949 |